United States Patent [19]
Scardilli et al.

[11] 3,962,008
[45] June 8, 1976

[54] MESSAGE TAPE FOR INSTRUMENT DISPLAY SYSTEMS

[75] Inventors: Vincent Scardilli, West Orange; Arthur Sussman, Jersey City, both of N.J.

[73] Assignee: The Bendix Corporation, Teterboro, N.J.

[22] Filed: Mar. 17, 1975

[21] Appl. No.: 559,296

Related U.S. Application Data
[62] Division of Ser. No. 203,621, Dec. 1, 1971, Pat. No. 3,900,647.

[52] U.S. Cl. .................................. 156/73.4; 156/7; 156/18; 156/277; 156/304; 428/58; 428/67
[51] Int. Cl.² .................. B29C 27/08; B32B 31/16
[58] Field of Search ............... 156/2, 3, 7, 18, 73.4, 156/157, 159, 277, 304, 306; 428/67, 57, 58

[56] References Cited
UNITED STATES PATENTS

| | | | |
|---|---|---|---|
| 3,331,719 | 7/1967 | Soloff | 156/157 |
| 3,493,448 | 2/1970 | Powell et al. | 156/157 |
| 3,519,507 | 7/1970 | Pierson | 156/157 |
| 3,580,755 | 5/1971 | Kidd, Jr. et al. | 156/3 |
| 3,900,647 | 8/1975 | Scardilli et al. | 428/67 |

FOREIGN PATENTS OR APPLICATIONS

| | | | |
|---|---|---|---|
| 870,020 | 6/1961 | United Kingdom | 161/5 |

*Primary Examiner*—William A. Powell
*Assistant Examiner*—Brian J. Leitten
*Attorney, Agent, or Firm*—Anthony F. Cuoco; S. H. Hartz

[57] ABSTRACT

A message tape for instrument display systems includes laminations of metallic and plastic materials. Messages are etched through a metallic lamination and dyes are applied through the etchings to provide color coding without introducing dimensional build-ups. The dyes are retained by a plastic backing lamination. The tape has the main advantage of being useful at elevated operating temperatures and ancillary advantages of improved image quality and lighting efficiency.

5 Claims, 6 Drawing Figures

MESSAGE TAPE FOR INSTRUMENT DISPLAY SYSTEMS

CROSS REFERENCE TO RELATED APPLICATIONS

This application is a division of U.S. patent application Ser. No. 203,621, filed Dec. 1, 1971, now U.S. Pat. No. 3,900,647.

The message tape of the invention may be used with mode annunciation display means for aircraft instrument panels such as described in copending U.S. application Ser. No. 884,112 filed Dec. 11, 1969, now U.S. Pat. No. 3,680,948 by Arthur Sussman and assigned to The Bendix Corporation, assignee of the present invention.

BACKGROUND OF THE INVENTION

1. Field of the Invention

This invention relates generally to message tapes for instrument display systems and particularly to a tape of the type described including plastic and metallic laminations so as to be useful at elevated operating temperatures.

2. Description of the Prior Art

Prior to the present invention message tapes for instrument display systems were made of a polyester base, fine grain photographic film. Infra-red light from the display system light source was absorbed by the black emulsion background on the film producing a requirement for infra-red filters to protect the tape from curling at elevated operating temperatures.

A message tape constructed according to the invention reflects most of the infra-red light and prevents local temperature buildups causing the aforenoted curling. Since the need for infra-red filters is eliminated, required brightness is achieved by a lower lamp source voltage to increase lighting efficiency and reduce cost. The opaque metallic message background provided by the tape of the invention provides improved display characteristics.

SUMMARY OF THE INVENTION

This invention contemplates a metallic-plastic laminated display tape formed in a closed loop configuration. One embodiment of the invention features a thin metallic lamination having fine resolution messages etched therethrough. Dyes for color coding are selectively applied to the etchings and a plastic backing lamination contains the dye. In another embodiment of the invention a plastic lamination is applied over the metallic lamination to protect the messages. The construction of the tape is such that the plastic laminations may be of the pressure sensitive adhesive type or, alternately, a metallic coating may be vacuum deposited over the plastic backing lamination.

One object of this invention is to provide a message tape for instrument display systems having the main advantage of being effective at elevated ambient temperatures.

Another object of this invention is to provide a tape of the type described wherein the need for infra-red filters is eliminated permitting required display brightness at a lower light source voltage and resulting in lower manufacturing cost.

Another object of this invention is to provide a message tape of the type described wherein contrast improvement at the display output is improved since an opaque metallic background is provided for the messages.

Another object of this invention is to provide a closed loop message tape achieved through an improved splicing arrangement.

The foregoing and other objects and advantages of the invention will appear more fully hereinafter from a consideration of the detailed description which follows, taken together with the accompanying drawing wherein several embodiments of the invention are illustrated by way of example. It is to be expressly understood, however, that the drawing is for illustration purposes only and is not to be construed as defining the limits of the invention.

DESCRIPTION OF THE INVENTION

The aforenoted patent application Ser. No. 884,112 describes a mode annunciation display device for aircraft instrument panels which is essentially an optical-mechanical instrument for informing the pilot of the craft of the real time status of auto throttle and auto pilot systems. The system features the use of a tapered optical fiber bundle which produces a magnified display of information microscopically recorded on an illuminated message tape. An improved tape for use with an instrument of this type is provided by the present invention.

Figure 1:
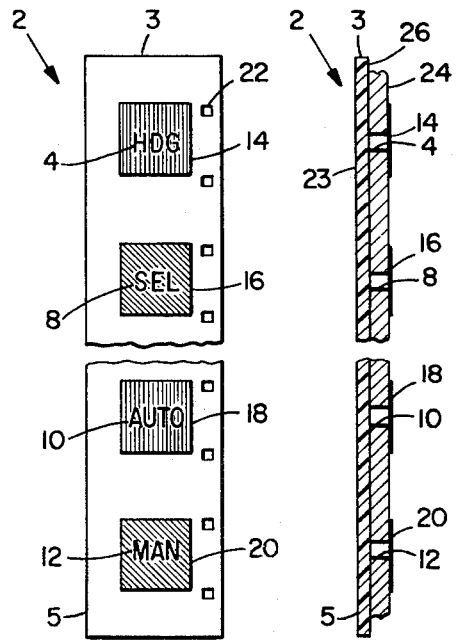
FIG. 1 is a pictorial representation showing generally a tape constructed according to the invention.

With reference to FIG. 1 a tape designated generally by the numeral 2 includes fine resolution messages 4, 8, 10 and 12, each of which has a color coding overlay 14, 16, 18 and 20, respectively. The tape has perforations 22 for accommodating a standard 16 mm sprocket drive along one edge thereof.

Figure 2:
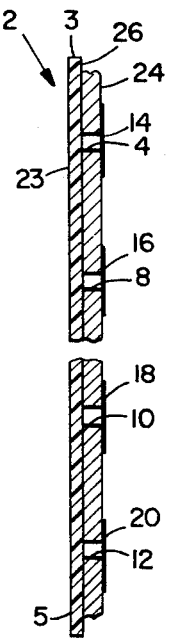
FIG. 2 is a sectional view of one embodiment of the tape shown generally in FIG. 1.

One embodiment of the invention is shown in FIG. 2 wherein tape 2 is shown as having a lamination 23 which may be of a polyester plastic such as that manufactured by the Dupont Co. under the trade name Mylar. Lamination 23 may be in the order of 0.0001 of an inch in thickness. A lamination 24 disposed over lamination 23 is of a suitable metal such as copper or aluminum and may be in the order of 0.0005 inches in thickness.

Mylar lamination 23 may be of the type having a pressure sensitive adhesive surface 26, and in which event metallic lamination 24 is placed over surface 26 and adheres thereto with the application of pressure. Alternately, metallic lamination 24 may be deposited on Mylar lamination 23 by vacuum deposition techniques well known and practiced in the art.

Messages 4, 8, 10 and 12 are photochemically etched through metallic layer 24. When the residual photoresistive compound is removed from metallic lamination 24 the adhesive bond on the exposed portion of surface 26 of mylar lamination 22 is also removed from the message stroke locations leaving clear mylar against the metal background as is the case if the aforenoted vacuum deposition technique is used to apply lamination 24 to lamination 22.

When the messages have been etched in metallic lamination 24, color dyes 14, 16, 18 and 20 are selectively applied thereover by conventional pressure coating or silk screening processes. Color coding is thus achieved without producing undesirable buildup on metallic surface 24.

Figure 3:
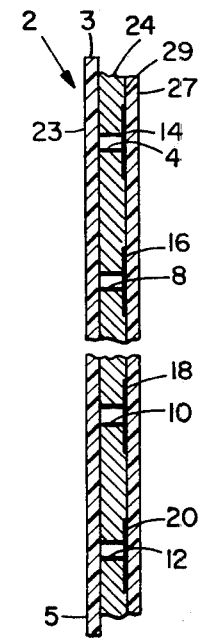
FIG. 3 is a sectional view of another embodiment of the tape shown generally in FIG. 1.

In the embodiment of the invention shown in FIG. 3, an additional 0.001 inch thick Mylar lamination 27 which has an adhesive surface 29 is applied over metallic lamination 24 to protect the fine resolution messages and color coding. It will be understood that in both embodiments of the invention Mylar lamination 23 which is in effect a backing serves to contain the color coding dye which flows through the etched messages 4, 8, 10 and 12.

Figure 4:
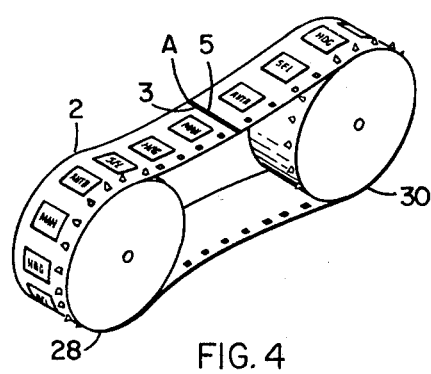
FIG. 4 is a pictorial representation of a tape loop constructed according to the invention

The aforenoted U.S. application Ser. No. 884,112 uses a continuous tape 2 which is driven over cylinders 28 and 30 shown in FIG. 4 by suitable driving means. In order to provide the continuous tape shown in FIG. 4, tape 2 shown in FIGS. 1, 2, and 3 must be spliced at ends 3 and 5 of plastic backing lamination 23.

Figure 5:
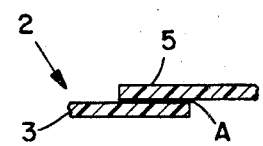
FIG. 5 is a sectional view showing one configuration for joining the ends of the tape loop shown in FIG. 4.
Figure 6:
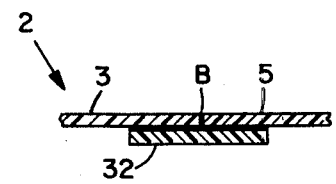
FIG. 6 is a sectional view showing another configuration for joining the ends of the tape loop shown in FIG. 4.

One spliced configuration is shown in FIG. 5 wherein ends 3 and 5 of tape 2 provided by lamination 23 are overlapped and untrasonically bonded at A. An alternate configuration is shown in FIG. 6 wherein ends 3 and 5 are butted one against the other and a Mylar boot 32 is ultrasonically bonded to both ends of the butt joint at B. The latter splicing configuration is preferable because it eliminates buildup over the splice, allowing for improved tape focusing and better output image quality.

A message tape constructed according to the invention offers several advantages principally in the areas of temperature effectivity image quality, lighting efficiency and cost. Since the tape construction reflects most of the infra-red light transmitted from the light source shown in the aforenoted copending U.S. application Ser. No. 884,112, local temperature buildups are prevented and the curling effect which was prevalent when prior art photographic tapes were used is eliminated. Further since infra-red filters are eliminated the message tape system may be constructed at a reduced cost.

The elimination of the infra-red filters permits required brightness at a lower source lamp voltage and thus provides increased lighting efficiency. Additionally the construction of the tape which features a totally opaque metal background as compared to relatively high photographic density levels of prior art tapes will provide a display contrast improvement which is highly desirable.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A method for manufacturing a message tape formed in a closed loop for instrument display systems comprising:
   providing a clear plastic backing lamination;
   applying a metallic lamination over the backing lamination;
   cutting messages through the metallic lamination to the backing lamination;
   applying a plurality of color coding dyes over the metallic lamination, and each of said dyes selectively extending through a cut message;
   retaining the color coding dyes with the backing lamination;
   providing longitudinally extending ends on the plastic backing lamination; and
   splicing said ends to provide the closed tape loop.

2. A method as described by claim 1, wherein splicing said ends to provide the closed tape loop includes:
   overlapping the backing lamination ends and bonding the overlapped ends.

3. A method as described by claim 1, wherein splicing said ends to provide the closed tape loop includes:
   butting the ends one against the other and bonding the butted ends.

4. A method as described by claim 2, wherein bonding the overlapped ends includes:
   ultrasonically bonding the overlapped ends.

5. A method as described by claim 3, wherein bonding the butted ends includes:
   ultrasonically bonding the butted ends.

* * * * *